US010863062B1

(12) United States Patent
Molina et al.

(10) Patent No.: US 10,863,062 B1
(45) Date of Patent: Dec. 8, 2020

(54) APPARATUS TO COVER FRONT AND REAR MOBILE DEVICE CAMERAS

(71) Applicant: IR3 Ventures LLC, Plantation, FL (US)

(72) Inventors: Igor E. Molina, Plantation, FL (US); Rafael Andres Roberto Vidal, Plantation, FL (US)

(*) Notice: Subject to any disclaimer, the term of this patent is extended or adjusted under 35 U.S.C. 154(b) by 0 days.

(21) Appl. No.: 16/674,342

(22) Filed: Nov. 5, 2019

(51) Int. Cl.
*H04N 5/225* (2006.01)
*H04B 1/3888* (2015.01)
*H04N 5/247* (2006.01)
*H04M 1/02* (2006.01)

(52) U.S. Cl.
CPC ....... *H04N 5/22521* (2018.08); *H04B 1/3888* (2013.01); *H04M 1/0264* (2013.01); *H04N 5/2253* (2013.01); *H04N 5/2256* (2013.01); *H04N 5/247* (2013.01); *H04M 2250/52* (2013.01)

(58) Field of Classification Search
CPC ............. H04N 5/22521; H04N 5/2256; H04N 5/2253; H04N 5/247; H04B 1/3888; H04M 1/0264; H04M 2250/52
See application file for complete search history.

(56) References Cited

U.S. PATENT DOCUMENTS

| 8,724,020 | B1* | 5/2014 | Haddad | H04N 5/2254 |
| | | | | 348/375 |
| D759,644 | S * | 6/2016 | Penn | D14/250 |
| D759,645 | S * | 6/2016 | Penn | D14/250 |
| D764,474 | S * | 8/2016 | Penn | D14/440 |
| 9,813,100 | B1 | 11/2017 | Adams et al. | |
| 10,003,371 | B1* | 6/2018 | Given | H04B 1/3888 |
| 10,237,380 | B1* | 3/2019 | Nguyen | H04M 1/0264 |
| 2005/0101348 | A1* | 5/2005 | Wang | G02B 13/001 |
| | | | | 455/556.1 |
| 2007/0242948 | A1* | 10/2007 | Miramontes | G03B 17/00 |
| | | | | 396/448 |
| 2010/0079661 | A1* | 4/2010 | Lin | H04N 5/2256 |
| | | | | 348/371 |

(Continued)

OTHER PUBLICATIONS

EyePatch Case, https://eyepatchcase.com/page/how-it-works, Jan. 4, 2019, pp. 1-5, retrieved Dec. 31, 2019. (Year: 2019).*

*Primary Examiner* — Albert H Cutler
(74) *Attorney, Agent, or Firm* — Sanchelima & Associates, P.A.; Christian Sanchelima; Jesus Sanchelima (57) ABSTRACT

An apparatus to cover mobile device cameras including a cover assembly is disclosed herein. The cover assembly includes a rear camera cover and a front camera cover. The rear camera cover is adapted to cover the rear camera of a mobile device and the front camera cover is adapted to cover the front camera of the mobile device. The cover assembly further includes an actuating member that urges front camera cover and rear camera cover to the front camera and rear camera respectively. Furthermore, the camera assembly covers both the front and rear camera while maintaining the functionality of the speaker and microphone on a mobile device. Additionally, the cover assembly provides an opening for the flash component on a mobile to allow a user to still use the flash of a mobile device. The apparatus may also cover additional components and sensors such as microphones, charging ports, and speakers.

19 Claims, 8 Drawing Sheets

(56) References Cited

U.S. PATENT DOCUMENTS

| | | | |
|---|---|---|---|
| 2015/0059251 A1* | 3/2015 | Rinner | G06F 1/1656 49/465 |
| 2015/0163385 A1* | 6/2015 | Haddad | G03B 17/565 348/374 |
| 2015/0311941 A1* | 10/2015 | Sorrentino | H04M 1/185 455/575.8 |
| 2015/0320167 A1* | 11/2015 | Nguyen | A45C 11/00 224/191 |
| 2016/0049979 A1* | 2/2016 | Grouwstra | H04B 1/3888 455/575.8 |
| 2018/0123631 A1* | 5/2018 | Hessabi | H04B 1/3888 |
| 2019/0018305 A1* | 1/2019 | Gahche | G03B 11/041 |
| 2020/0028994 A1* | 1/2020 | Rami | H04N 5/2251 |

* cited by examiner

APPARATUS TO COVER FRONT AND REAR MOBILE DEVICE CAMERAS

BACKGROUND OF THE INVENTION

1. Field of the Invention

The present invention relates to a camera cover and, more particularly, to an apparatus to cover front and rear mobile device cameras. Additionally, the apparatus may also cover additional components of the mobile device such as but not limited to speakers and microphones. Furthermore, the apparatus provides ideal and optimal protection and privacy to the cameras and the additional components against possible blunt force damage and scratches that may occur.

2. Description of the Related Art

Several designs for an apparatus to cover front and rear mobile device cameras have been designed in the past. None of them, however, include an apparatus/case for covering both the front and rear cameras of a mobile device. The case comprises a cover assembly mounted to within a case. Furthermore, the cover assembly comprises a rear camera cover adapted to cover the rear cameras and a front camera cover adapted to cover the front cameras of a mobile device. The cover assembly comprises an actuating member to urge the rear camera cover towards the rear cameras and independently urges the front camera cover through a guiding extension until the front cameras is covered.

It is known that individuals often have a desire to protect their privacy in their everyday lives. It is also known that an individual may often want to cover the cameras on a mobile cellphone device to prevent other users with malicious intent from accessing their private information. Therefore, there is a need for an apparatus to cover front and rear mobile device cameras that provide a user with optimal privacy while still maintaining the functionality of the mobile device. Additionally, the apparatus may cover additional sensors of a phone such as the microphone and the speaker. Furthermore, the apparatus provides added protection against blunt force damages against the cameras and other components of the phone. As a result, the present invention prevents the cameras and other components from obtaining unwanted scratches. These components may include but are not limited to the microphones and speakers of a mobile device.

Applicant believes that a related reference corresponds to U.S. Pat. No. 9,813,100B1 for a privacy enhancing device case. The device case has a body forming a compartment holding an electronic device with a back facing camera lens and a front side with a user interface display and front facing camera lens. The device case has a movable lens cover attached to the body and held by the body when moved to any of an open position, a first position, and a second position. However, it differs from the present invention because the U.S. Pat. No. 9,813,100B1 reference has a complicated configuration. Furthermore, the reference covers the flash and speaker component of a mobile device. This restricts a user from utilizing the flash component of a mobile device while the cover is enabled. The present invention addresses this issue by providing an apparatus to cover front and rear mobile device cameras comprising a cover assembly. The present invention may further be configured to cover the microphone of a mobile device. The cover assembly includes an opening which allows a user to utilize the flash component of a mobile device even when the cover is enabled. Additionally, the front camera cover may not obscure the speaker of the mobile device.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide an apparatus to cover front and rear mobile device cameras that covers both the front and the rear camera of a mobile devices.

It is another object of this invention to provide an apparatus to cover front and rear mobile device cameras that covers both the front and rear camera of a mobile device while maintaining the function of the speaker of the mobile device. Additionally, the apparatus may also cover the microphone of a mobile device.

It is still another object of the present invention to provide an apparatus to cover front and rear mobile device cameras that provides an opening for the flash component so a user may still utilize the flash component of a mobile device while covering the rear cameras and front cameras of the mobile device.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Referring now to the drawings, where the present invention is generally referred to with numeral 10, it can be observed an apparatus to cover front and rear mobile device cameras 10 that basically includes a cover assembly 20 and a case assembly 40.

Figure 1:
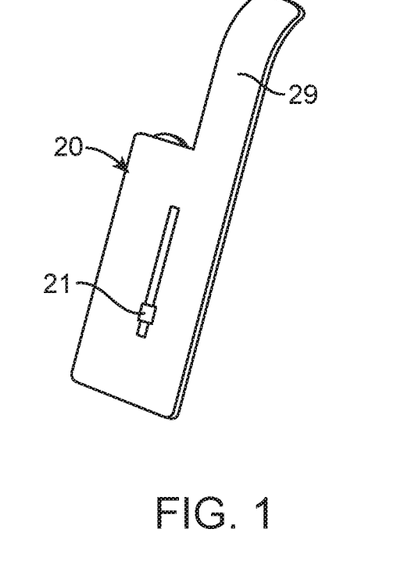
FIG. 1 represents an isometric view of cover assembly 20 having actuating member 21 and tunnel 29 in accordance to an embodiment of the present invention.
Figure 2:
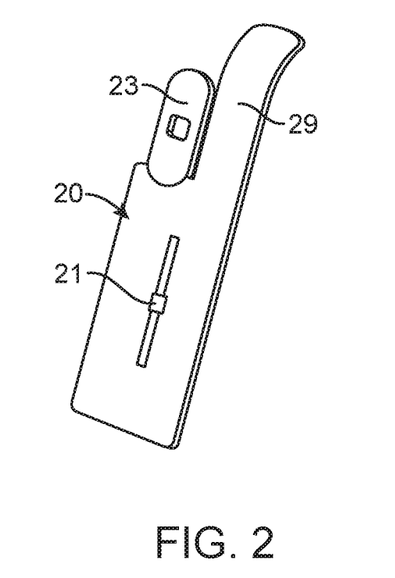
FIG. 2 shows another isometric view of cover assembly 20 wherein rear camera cover 23 may be seen protruding outward of cover assembly 20 in accordance to an embodiment of the present invention.
Figure 3:
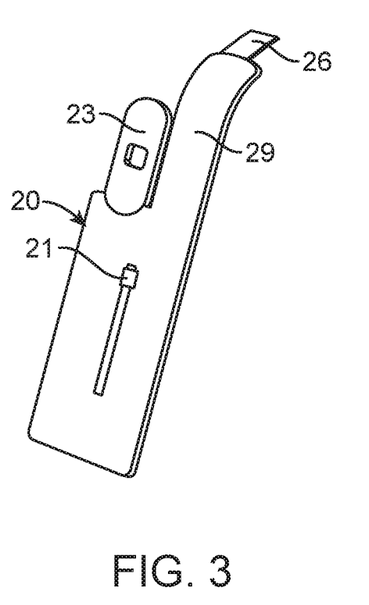
FIG. 3 represents another isometric view of cover assembly 20 wherein rear camera cover 23 and front camera cover 26 may be seen protruding outward of cover assembly 20 in accordance to an embodiment of the present invention.
Figure 4:
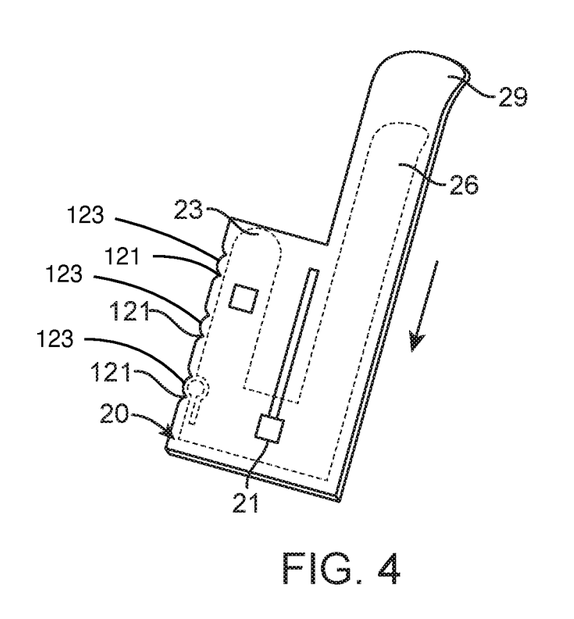
FIG. 4 shows an interior isometric view of cover assembly 20 depicting locking mechanism 22 therein in accordance to an embodiment of the present invention.
Figure 5:
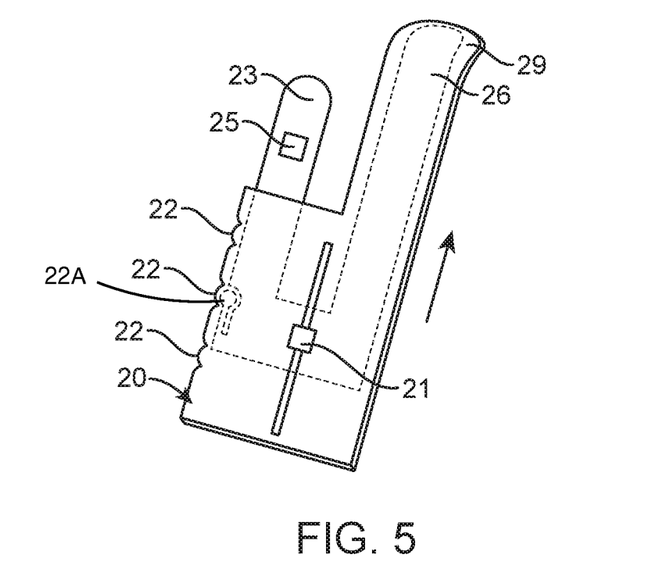
FIG. 5 represents another interior isometric view of cover assembly 20 wherein rear camera cover 23 may be seen protruding outward of cover assembly 20 in accordance to an embodiment of the present invention.
Figure 6:
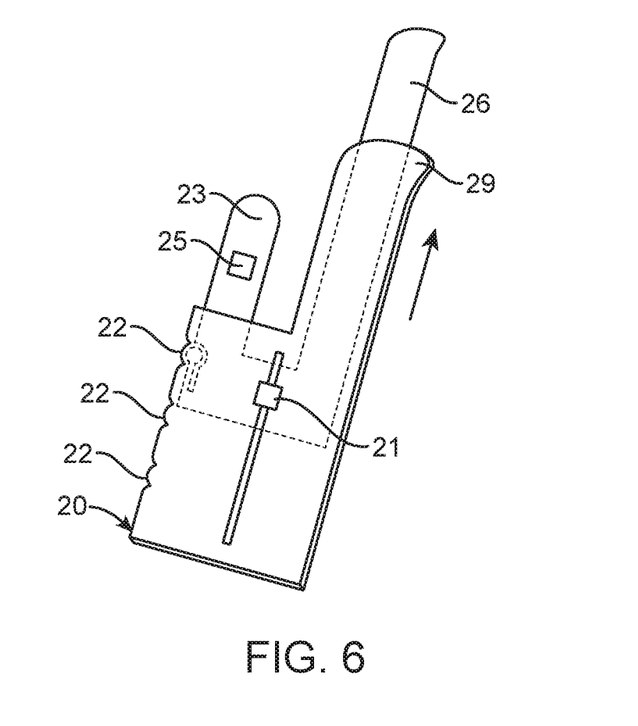
FIG. 6 represents another isometric interior view of cover assembly 20 wherein rear camera cover 23 and front camera cover 26 may be seen protruding outward of cover assembly 20 in accordance to an embodiment of the present invention.
Figure 7:
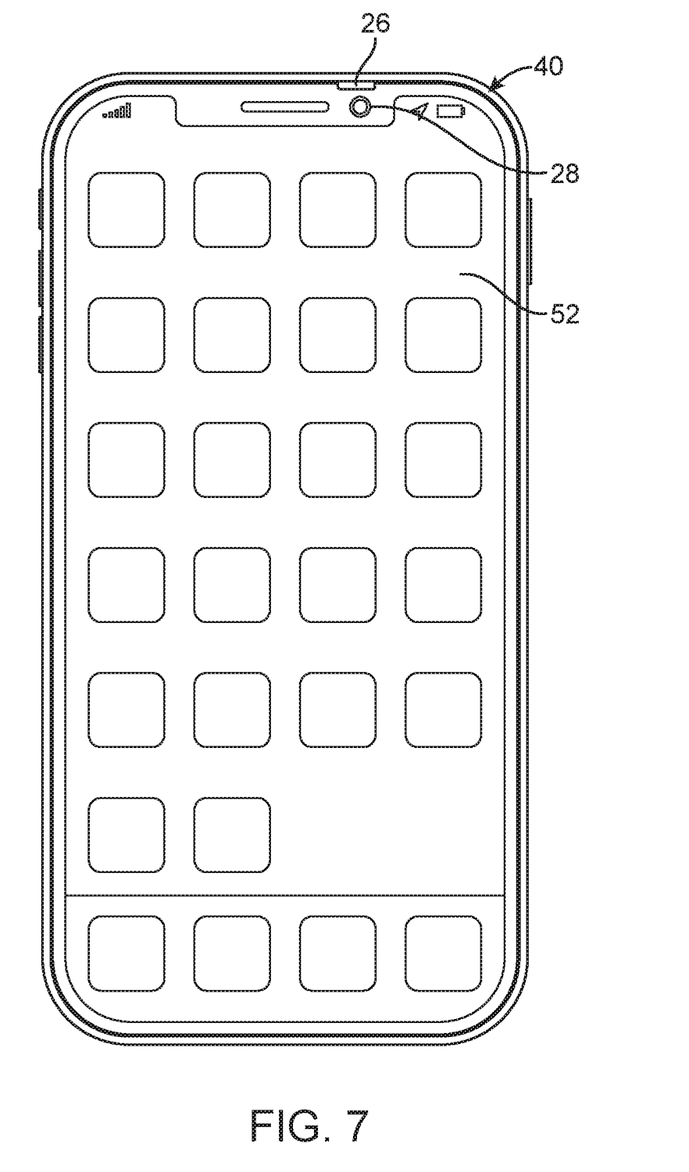
FIG. 7 illustrates a front view of a mobile device 52 having case assembly 40 and cover assembly 20 mounted thereon, wherein front camera cover 26 may be seen resting therein tunnel 29 in accordance to an embodiment of the present invention.
Figure 8:
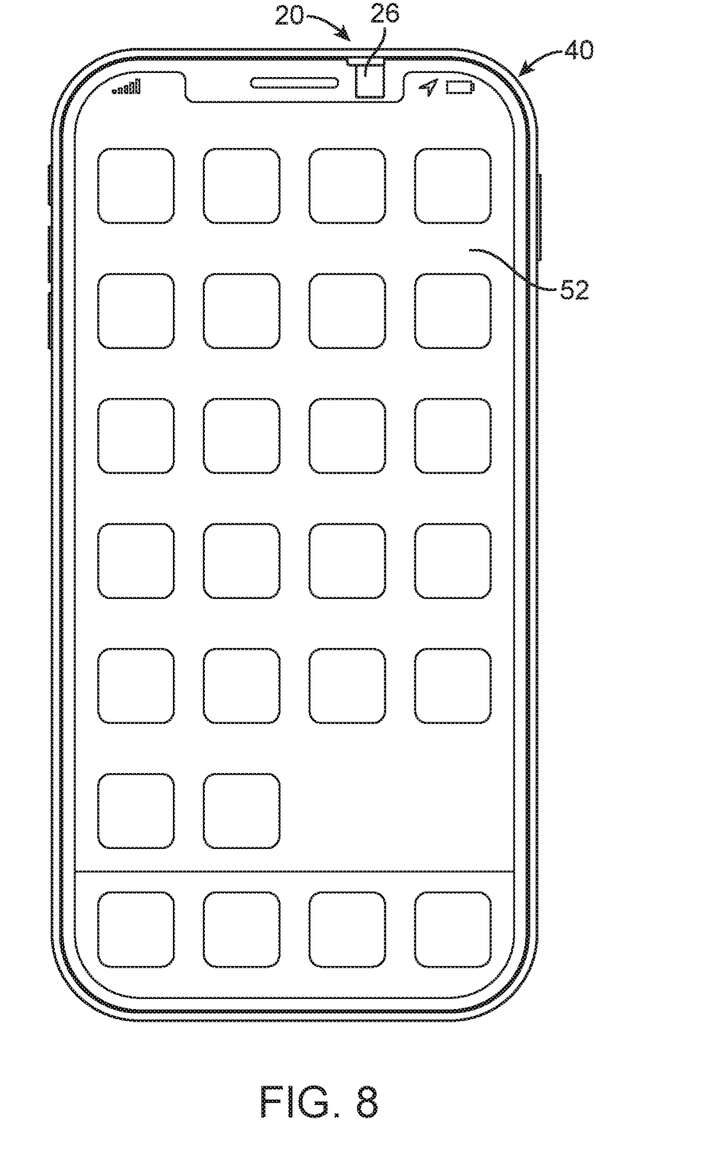
FIG. 8 is a representation of a front view of a mobile device 52 having case assembly 40 and cover assembly 20 mounted thereon, wherein front camera cover 26 may be seen protruding outwardly from tunnel 29 to then cover front camera 28.
Figure 9:
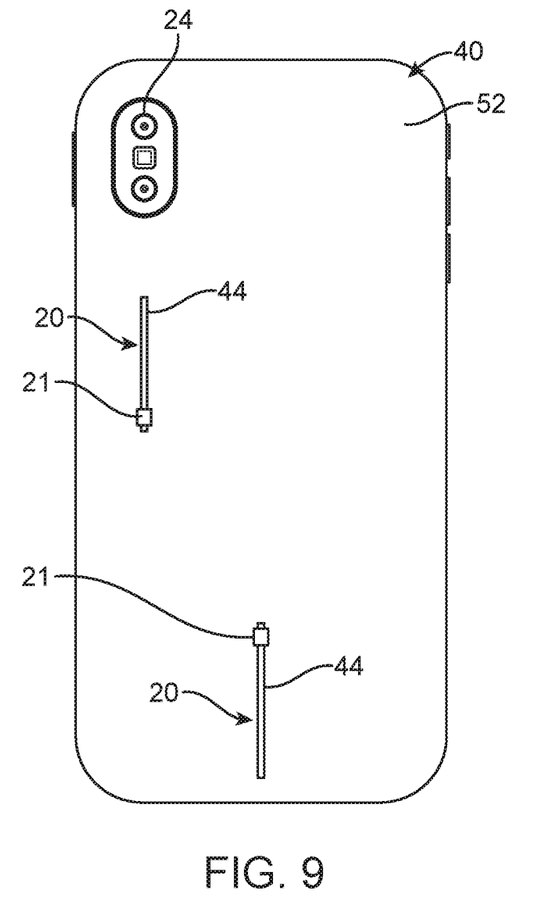
FIG. 9 represents a back view of a mobile device 52 having case assembly 40 thereon and further having cover assembly 20 mounted thereon in accordance with an embodiment of the present invention.
Figure 10:
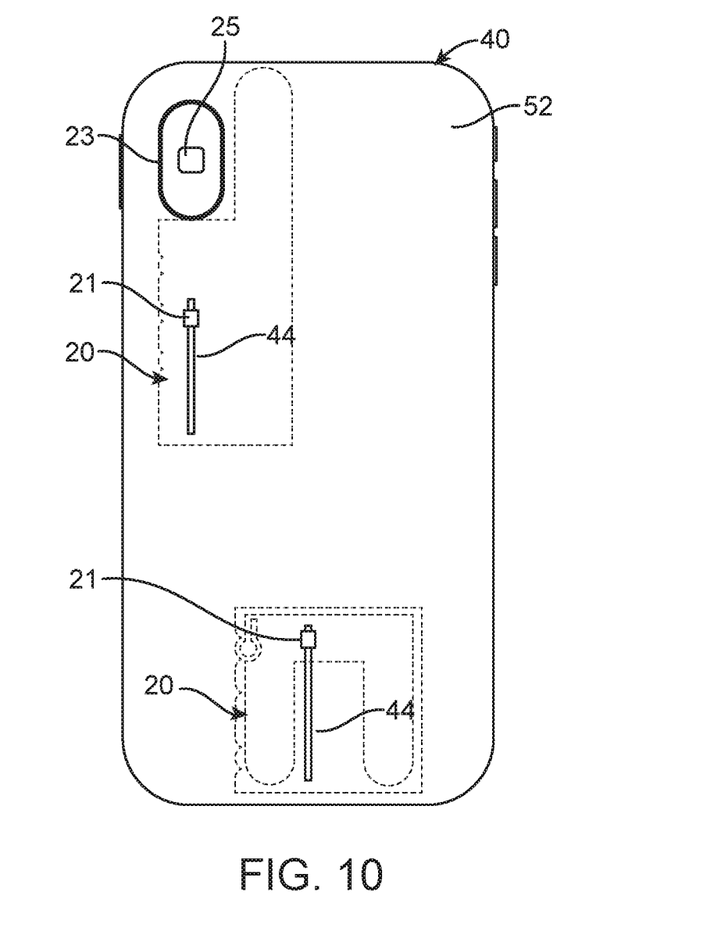
FIG. 10 shows a back view of a mobile device 52 having case assembly 40 thereon and further having cover assembly 20 mounted thereon, wherein rear camera cover 23 may be seen protruding outwardly from cover assembly 20 and covering rear camera 24.
Figure 11:
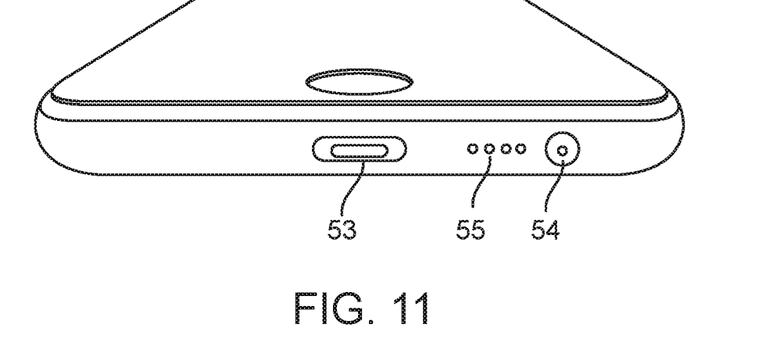
FIG. 11 represents an isometric bottom view of mobile device 52 having case assembly 40 thereon and further having cover assembly 20 mounted thereon, wherein a charging port 53, a microphone 54, and speakers 55 may be observed in accordance to an embodiment of the present invention.
Figure 12:
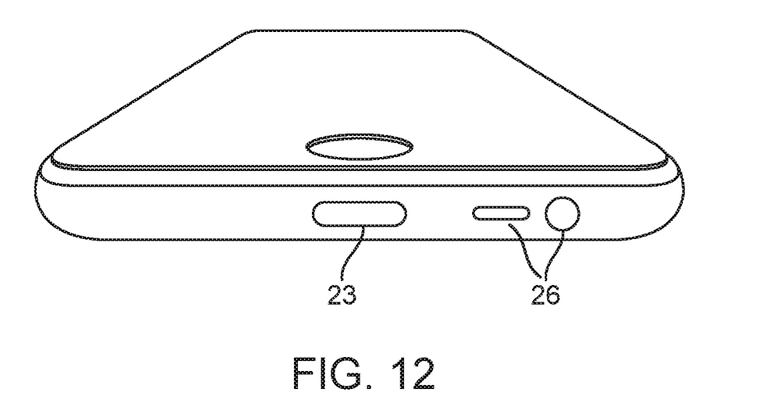
FIG. 12 shows another isometric bottom view of mobile device 52 having case assembly 20 covering a charging port 53, a microphone 54, and speakers 55 in accordance to an embodiment of the present invention.
Figure 13:
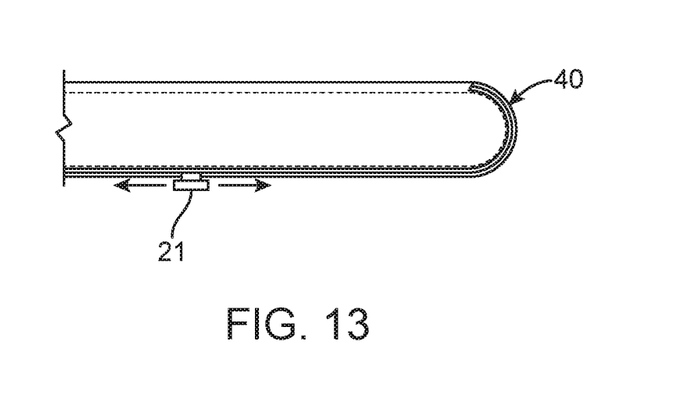
FIG. 13 illustrates a side view of a mobile device 52 where in slider 46 may be observed in accordance with an embodiment of the present invention.

Cover assembly 20 includes a rear camera cover 23 and a front camera cover 26. Rear camera cover 23 may be made of a suitable non-transparent material that allows rear camera cover 23 to cover a rear camera 24. It should be understood, that rear camera 24 is not limited to being a single camera but can also include any number of additional cameras that may be found on the rear of a mobile device. Rear camera cover 23 is housed within cover assembly 20. Additionally, rear camera cover 23 is of a shape that cooperates with rear camera 24. It should be understood that the shape of rear camera cover 23 may be adapted to fit any rear camera of a mobile device 52 in the market. Rear camera cover 23 additionally comprises a rear camera opening 25. Rear camera opening 25 is configured thereon a flash component of mobile device 52. Furthermore, rear camera opening 25 is of a shape that cooperates with the flash component of mobile device 52. Rear camera opening 25 allows a user to utilize the flash component of mobile device 52 even when rear camera 24 is covered by rear camera cover 23. Front camera cover 26 may also made of a suitable transparent or non-transparent material that allows front camera cover 26 to cover a front camera 28. It should be understood, that front camera 28 is not limited to being a single camera but can also include any number of additional cameras found in the front of a mobile device. Additionally, front camera cover 23 is of a shape that cooperates with front camera 28. It should be understood that the shape of front camera cover 26 may be adapted to fit any front camera including additional front cameras on a mobile device 52 on the market. In the present embodiment, front camera cover 26 is housed within a tunnel 29 disposed within the thickness of cover assembly 20. Additionally, cover assembly 20 is provided as an integral part of case assembly 40 therein. Front camera cover 26 is adapted to bend along the curvature of the inner top edge of said case assembly 40. Front camera cover 26 covers front camera 28 without affecting or obstructing the speaker located on mobile device 52. This allows a user to comfortably utilize the speaker of mobile device 52 while simultaneously covering front camera 28. This is especially useful when a user wishes to make a phone call while still having front camera 28 covered. In one embodiment, cover assembly 20 may further include at least one locking mechanism 22 mounted within the inner body of cover assembly 20. It should be understood that additional embodiments of cover assembly 20 may omit locking mechanism 22 and fall within the scope of the present invention. Locking mechanism 22 may be provided along a side of cover assembly 20 as shown in FIG. 5. Additionally, locking mechanism 22 may be provided as various indentations 121 along the side wall of cover assembly 20. These indentations may receive an anchoring member 22A mounted along the side of rear camera cover 23. The anchoring member 22A is received along the indentations 121 and locked in place. It should be understood that any number of locking mechanisms 22 may be mounted within cover assembly 20. As rear camera cover 23 is urged towards rear camera 24, anchoring member 22A travels along a sidewall of cover assembly 20 until it reaches nook 123 between indentations 121 so that rear camera cover 23 does not slide on its own. Rather a predetermined amount of force applied by a user is what releases anchoring member 22A out of its locked position within nook 123. In alternate embodiments, various nooks can be used to provide different locking positions.

In one embodiment of the present invention, front camera cover 26 is of a size smaller than rear camera cover 23. This allows front camera cover 26 to fit within tunnel 29 as well as cover front camera 28. In yet another embodiment of the present invention, cover assembly 20 may be of a rectangular shape and housed within the backside of cover assembly 40. Cover assembly 20 is additionally hollow therethrough and houses rear camera cover 23 and front camera cover 26 therein. It should be understood that the shape of cover assembly 20 and case assembly 40 may change in order to cooperate with the shape of whatever mobile device it is mounted on. Additionally, cover assembly 20 is provided as an integral part within case assembly 40. This may include mobile phones of varying shapes and sizes. Cover assembly 20 further includes an actuating member 21 disposed on cover assembly 20 thereon. It is to be understood that in one embodiment, actuating member 21 can be a slider. Actuating member 21 is communicably attached to rear camera cover 23 and front camera cover 26. In one embodiment, rear camera cover 23 and front camera cover 26 are in their resting position housed within cover assembly 20. A user may then apply an upward force to actuating member 21 thereby moving rear camera cover 23 and front camera cover 26 such that they cover rear camera 24 and front camera 28. In this position rear camera cover 23 and front camera cover 26 protrude out of cover assembly 20. Front camera cover 26 bends along the inner top edge of case assembly 40 in order to cover front camera 28. In another embodiment of the present invention cover assembly may include only rear camera cover 23 or only front camera cover 26 or both. In one embodiment, as actuating member 21 is actuated by a slider.

Case assembly 40 further includes a slit 44. Case assembly 40 may be made of any suitable material to be fitted onto mobile device 52. Furthermore, case assembly 40 may be of any suitable shape to fit around mobile device 52 so as to fit various mobile devices on the market. In one embodiment of the present invention, case assembly 40 is adapted to be installed around the periphery of mobile device 52. In another embodiment of the present invention, case assembly 40 is adapted to be installed around the entirety of mobile device 52. Slit 44 is located on the backend of case assembly 40. Slit 44 is an opening that aligns with the path of actuating member 21 mounted thereon mobile device 52. Slit 44 provides a user with access to actuating member 21 such that a user may apply a force to actuating member 21. Actuating member 21 is mounted through slit 44. In one embodiment of the present invention, a user applies a force to actuating member 21 to then urge actuating member 21 a predetermined amount to first move rear camera cover 23 to then cover rear camera 24. As a result, cover assembly 20 is now locked into a middle locking member 22. In this configuration, rear camera 23 is covered while front camera 28 remains uncovered. A user may then further actuate actuating member 21 to then have front camera cover 26 then cover front camera 28. As a result, cover assembly 20 is now locked into locking member 22 located along a top side of cover assembly 20. In this configuration, both rear camera 23 and front camera 28 are in a covered position. It should be understood that additional embodiments may feature an actuating member 21 to exclusively cover rear camera 24 or front camera 28. In another embodiment, front camera 23 and rear camera 28 are both covered simultaneously. In yet another embodiment of the present invention, an additional cover assembly 20 may be provided thereon case assembly 40. In this embodiment cover assembly 20 may be configured to cover additional components as a mobile device such as a charging port 53, a microphone 54, and speakers 55 located on mobile device 52. Furthermore, it should be understood that the location of these components may vary depending on mobile device 52. Cover assembly 20 may be adapted to cover any number of microphones, speaker, and ports on mobile device 52 regardless of their location on mobile device 52.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. An apparatus to cover at least one mobile device component, comprising:
   a. a cover assembly, including a front camera cover to cover a front camera, wherein said cover assembly further includes an actuating member, wherein said actuating member urges said front camera cover towards said front camera until said front camera is covered, wherein said actuating member is located on a back surface of a mobile device, wherein said front camera cover begins on said back surface and moves along said back surface until said front camera cover wraps over a top edge of said mobile device to then cover said front camera; and
   b. a case assembly that includes said cover assembly, wherein said case assembly is adapted to be mounted to said mobile device.

2. The apparatus to cover at least one mobile device component of claim 1 wherein said actuating member slides along said back surface of said mobile device.

3. The apparatus to cover at least one mobile device component of claim 1 wherein said cover assembly has a thickness and a tunnel located within said thickness.

4. The apparatus to cover at least one mobile device component of claim 3 wherein said front camera cover is partially housed within said tunnel of said cover assembly.

5. The apparatus to cover at least one mobile device component of claim 1 wherein said cover assembly includes a rear camera cover to cover a rear camera, wherein said actuating member additionally urges said rear camera cover to move along said back surface towards said rear camera until said rear camera is covered.

6. The apparatus to cover at least one mobile device component of claim 5 wherein said cover assembly further includes a slider, wherein said slider is fitted through a slit of said case assembly to be communicably mounted to said actuating member, wherein said slider when actuated urges said actuating member to move said rear camera cover towards said rear camera, and upon additional force being applied to said slider, said front camera cover then covers said front camera.

7. The apparatus to cover at least one mobile device component of claim 5 wherein said rear camera cover and said front camera cover includes a flash opening and/or a microphone opening and/or a speaker opening to allow a flash component and/or a microphone component, and/or a speaker component respectively of a mobile device to be exposed while said rear camera is covered by said rear camera cover and said front camera is covered by said front camera cover.

8. The apparatus to cover at least one mobile device component of claim 1 wherein said case assembly further includes a slit configured to provide a user access to said actuating member.

9. The apparatus to cover at least one mobile device component of claim 1 wherein said cover assembly includes a cover that travels under a bottom edge of said mobile device to cover additional mobile device components.

10. The apparatus to cover at least one mobile device component of claim 1 wherein at least one locking mechanism is included within a sidewall of said cover assembly to lock said front camera cover in a predetermined position.

11. A system to cover front and rear mobile device cameras, comprising:
   a. a mobile device, including a front camera and a rear camera, said mobile device further including a microphone, a charging port, and speakers;
   b. a cover assembly, including a rear camera cover to cover said rear camera of said mobile device and a front camera cover to cover said front camera of said mobile device, said cover assembly further includes an actuating member, wherein said actuating member urges said front camera cover towards said front camera until said front camera is covered, wherein said actuating member is located on a back surface of said mobile device, wherein said front camera cover begins on said back surface and moves along said back surface until said front camera cover wraps over a top edge of said mobile device to cover said front camera, wherein said actuating member additionally urges said rear camera cover towards said rear camera until said rear camera is covered; and
   c. a case assembly wherein said cover assembly is provided as an integral part of said case assembly.

12. The system to cover front and rear mobile device cameras of claim 11 wherein said cover assembly also includes a tunnel within its thickness.

13. The system to cover front and rear mobile device cameras of claim 12 wherein said front camera cover is partially housed within said tunnel of said cover assembly.

14. The system to cover front and rear mobile device cameras of claim 11 wherein said front camera cover bends along the curvature of an inner top edge of said case assembly.

15. The system to cover front and rear mobile device cameras of claim 11 wherein said case assembly further includes a slit located on the backend of said case assembly to provide a user access to said actuating member.

16. The system to cover front and rear mobile device cameras of claim 15 wherein said cover assembly further includes a slider, wherein said slider is fitted through said slit to be communicably mounted to said actuating member, wherein a user applies a force to said slider to then urge said actuating member to move said front camera cover and said rear camera cover to then cover said front camera and said rear camera simultaneously.

17. The system to cover front and rear mobile device cameras of claim 11 wherein said rear camera cover includes an opening to allow the flash component of a mobile device to be utilized while said rear camera is covered by said rear camera cover.

18. The system to cover front and rear mobile device cameras of claim 11 wherein said cover assembly includes a cover that travels under a bottom edge of said mobile device to cover additional mobile device components.

19. The system to cover front and rear mobile device cameras of claim 11 wherein three locking mechanisms are provided within said cover assembly to lock said front camera cover and said rear camera cover in a predetermined position.

* * * * *